(12) United States Patent
Wang et al.

(10) Patent No.: US 7,684,541 B2
(45) Date of Patent: Mar. 23, 2010

(54) SYSTEM AND METHOD CAPABLE OF SIMULTANEOUS RADIOGRAPHIC EXAMINATION AND RADIOACTIVE MATERIAL INSPECTION

(75) Inventors: Xiaobing Wang, Beijing (CN); Yu He, Beijing (CN); Kun Zhao, Beijing (CN); Qingjun Zhang, Beijing (CN); Hua Peng, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 30 days.

(21) Appl. No.: 12/051,948

(22) Filed: Mar. 20, 2008

(65) Prior Publication Data

US 2009/0236537 A1    Sep. 24, 2009

(51) Int. Cl.
    *G01N 23/06*    (2006.01)

(52) U.S. Cl. .......................................... 378/57
(58) Field of Classification Search .................. 378/57, 378/58, 70, 86–90
    See application file for complete search history.

(56) References Cited

U.S. PATENT DOCUMENTS

| | | | | |
|---|---|---|---|---|
| 3,832,545 A | * | 8/1974 | Bartko | 376/159 |
| 2006/0256914 A1 | * | 11/2006 | Might et al. | 378/57 |
| 2006/0262901 A1 | * | 11/2006 | Heaton et al. | 378/57 |
| 2008/0157986 A1 | * | 7/2008 | Proctor et al. | 340/600 |
| 2008/0205594 A1 | * | 8/2008 | Bjorkholm | 378/53 |
| 2009/0086906 A1 | * | 4/2009 | Clayton | 378/57 |

* cited by examiner

*Primary Examiner*—Irakli Kiknadze
(74) *Attorney, Agent, or Firm*—Westman, Champlin & Kelly, P.A.

(57) ABSTRACT

The present invention relates to the field of radiographic examination and radioactive material inspection, and provides a system and a method capable of simultaneous radiographic examination and radioactive material inspection. The system comprises a radiographic examination system and a radiation monitor; wherein the radiographic examination system comprises an accelerator and a synchronization controller, and the radiation monitor comprises a detector, a front end circuit, a signal transmission controller, a data collecting, analyzing and processing computer, an alarm device and so on. The present invention combines the radiographic examination system and the radiation monitor tightly so that the radioactive material inspection can be executed while the radiographic examination is performed, thereby the examination efficiency is improved and the occupied area of the system is reduced.

11 Claims, 5 Drawing Sheets ary detection influences on the image through reducing X/γ radiations of the accelerator, which also meets the requirements of various customers for the container examination system and radiation monitor to do work simultaneously and for quickly inspecting radioactive materials while doing radiographic examination.

SYSTEM AND METHOD CAPABLE OF SIMULTANEOUS RADIOGRAPHIC EXAMINATION AND RADIOACTIVE MATERIAL INSPECTION

FIELD OF THE INVENTION

The present invention relates to the field of radioactive material inspection, and particularly, to the technology for inspecting radioactive material while performing radiographic examination by integrating a radiographic examination system and a radiation monitor together.

BACKGROUND OF THE INVENTION

In the prior art, the technology for radioactive material inspection and the technology for vehicle/container examination with accelerators as radiation sources have been developed, and both do well in respective inspection fields.

The conventional radioactive material inspection technology usually uses the abnormal change of the system count rate caused by the radiations emitted during the object (e.g. pedestrian, package, vehicle, container and train) passes through the monitor, to inspect the radiations and know whether there is radioactive material in the object under inspection.

The vehicle/container examination system with accelerators as radiation sources is a typical radiographic system, which reflects the difference between the object's internal mass thicknesses by detecting the changes of the intensity of X/γ radiations which penetrate the object. As for the radiation sources of the container examination system, there are three kinds, i.e. radioactive isotopes, X-ray machines and accelerators. Most countries of the world employ such kind of radiographic system to inspect smuggle and security of vehicle/containers due to the advantages such as strong penetrability etc. of the radiographic system which uses an accelerator as the radiation source.

The radiographic examination and the radiation inspection both are used at the customs, the borders and important gateways to achieve security inspection. So, there is a need for an integrated technology to quickly inspect radioactive materials while doing radiographic examination such that the affect on the legal trade currency tightly relevant to the state economy can be reduced as much as possible.

However, when the vehicle/container examination system is examining vehicle/containers by using an accelerator as the radiation source, the accelerator will emit a lot of X/γ radiations while the radiation monitor just determines whether there is radioactive material in the object under inspection by detecting radiations. Consequently, when the radiographic examination system and the radiation monitor are combined simply, the radiation monitor will be interfered by X-rays when doing radiographic examination.

SUMMARY OF THE INVENTION

In order to overcome the disadvantages in the existing technologies, the present invention is done. It is an object of the invention to provide a system capable of simultaneous radiographic examination and radioactive material inspection, comprising a radiographic examination system and a radiation monitor; wherein the radiographic examination system comprises an accelerator and a synchronization controller, and the radiation monitor comprises a detector, a front end circuit, a signal transmission controller, a data collecting, analyzing and processing computer and an alarm device.

A synchronization controlling signal coming from the synchronization controller in the radiographic examination system forms a gate signal with adjustable pulse width in the signal transmission controller in the radiation monitor, which is operable to remove the data collected by the radiation monitor during the emission of the accelerator.

Preferably, the radiation monitor sets an alarm threshold on the basis of the background count rate when the system detects no objects. A modified photomultiplier tube (PMT) additional circuit is provided in the radiation monitor to achieve rapid recovery of the detector after short-time high-dose irradiations.

Preferably, the system cuts down the source of the electrons by controlling electric field between the first dynodes of the PMT by means of an external synchronization signal to effectively remove the affect of the short-time high-dose X/γ radiations.

Preferably, the PMT adopted in the photomultiplier tube additional circuit is provided with a voltage divider loop having a cathode grounded or a voltage divider loop having an anode grounded.

Another aspect of the present invention is to provide a method capable of simultaneous radiographic examination and radioactive material inspection, comprising the steps of: initializing and self-checking at the radiation monitor; entering into a background mode to detect radiations, and continuously collect and timely update the background count rate, and generate an alarm if the intensity of the background radiations goes beyond the normal range; triggering an occupancy/speed detector and causing the radiation monitor enter into a detection mode if the object comes into the detection area of the monitor system; emitting X/γ from an accelerator radiations by pulses to start radiographic examination for the containers; cutting down the source of the electrons generated by the PMT by controlling electric field between the first dynodes of the PMT using an accelerator emission synchronization signal from the radiographic examination system, to effectively remove the affect of the short-time high-dose X/γ radiations; completing the radiographic examination and radioactive material inspection after the object has passed through the inspection passage.

Preferably, if the radiation monitor needs system maintenance, it enters into a maintenance mode from the background mode, in which functions such as user setting, parameters acquiring and modifying, functions/algorithms adjusting and using, etc can be executed.

Preferably, in the step of cutting down the source of the electrons, the accelerator emission synchronization signal is sent to the radiation monitor through the synchronization controller, and forms a gate signal with adjusted pulse width in the signal transmission controller in the radiation monitor to remove the data collected by the monitor during the emission of the accelerator.

Preferably, a modified PMT additional circuit is provided in the monitor to achieve rapid recovery of the detector after short-time high-dose irradiations. The monitor sets an alarm threshold on the basis of the background count rate when the system detects no objects. The PMT adopted in the photomultiplier tube additional circuit is provided with a voltage divider loop having a cathode grounded or a voltage divider loop having an anode grounded.

The technical solution according to embodiment of the present invention overcomes the disadvantages in the prior art by performing radioactive material inspection while the vehicle/container examination system with an accelerator as radiation source is executing radiographic examination, without these two systems being placed far away or radioactive material inspection being inspected after the radiographic examination, thereby the examination efficiency can be improved and the occupied area of the system can be reduced.

The system according to an embodiment of the present invention can achieve the functions of both the radiation monitor and the radiographic examination system by means of a synchronization signal with adjustable pulse width, but also provides a rapid recovery circuit of the PMT, reduces the affect of the accelerator emission on the detector of the radiation monitor by controlling the electric field between the first dynodes of the PMT by means of an external synchronization signal during the emission of the accelerator.

DETAILED DESCRIPTION OF THE PREFERRED EMBODIMENTS

The following embodiments are illustrative of an embodiment of the present invention, but not for limiting the scope of the present invention.

Firstly, a brief description of a radiation monitor will be given below.

The operating principle of the radiation monitor is as following. The abnormal changes of the system count rate caused by the radiations emitted during a radioactive material/special nuclear material passes are detected by a radiation detector to determine whether the pedestrian, the package, the vehicle or the train under inspection carriers radioactive material/special nuclear material. The monitor can be widely used for security inspection at customs, borders, airports, nuclear power plants and other important passages, and is an effective way to prevent illegal transfer of radioactive materials.

The detailed technology principle of the radiation monitor is described as following.

1) Gamma rays and/or neutrons emitted from the radioactive material enter into a detector and interact with the materials of the detector to become an electric pulse signal to be outputted. The electric pulse signal is recorded when passing a data collecting and processing system. The number of pulses recorded in one time unit is called a count rate.

2) Other than the leaking radiations of the radioactive material which can incur such recording, there is a count caused by cosmic rays which continuously strike the atmosphere and naturally occurring radioactive materials existing in the environment. Such a count is called a background count. In order to analyze the level of the radiation of the radioactive material, the background count should be taken into account and modified.

3) A radiation detector is operable to detect the abnormal change of the system count rate caused by the radiations emitted by the radioactive material during passage to determine whether there is radioactive material in the object under inspection. In order to effectively inspect radioactive material, the monitor sets an alarm threshold by analysis with statistic algorithm on the basis of the background count rate, to satisfy the requirements on sensitivity of the monitor, as well as inspection speed and false alarm rate. When the object under inspection is passing, the monitor generates an alarm if the measured radioactive count rate is above the threshold.

Figure 1:
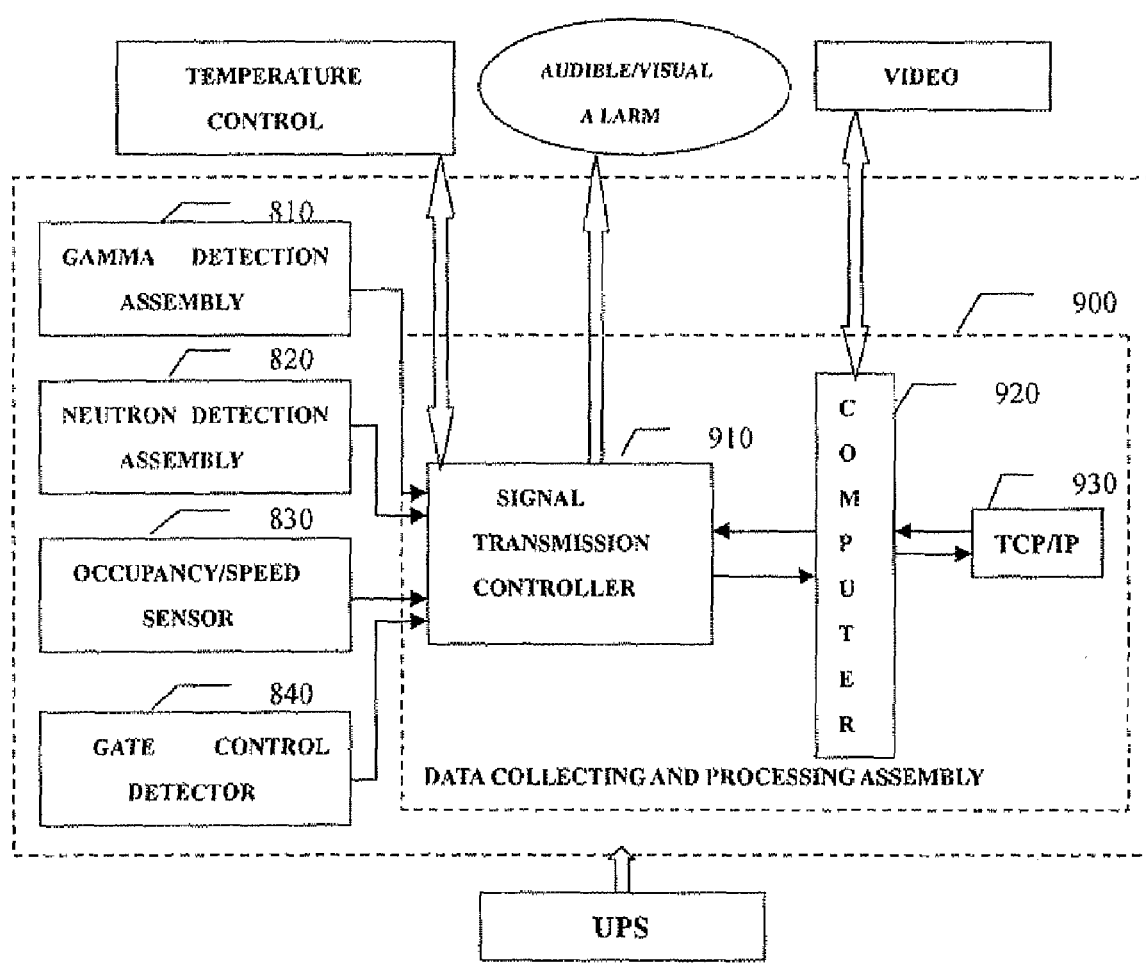
FIG. 1 is a schematic diagram of a radiation monitor according to an embodiment of the present invention.

The radiation monitor is constructed as shown in FIG. 1. In FIG. 1, the monitor is mainly composed of a gamma detection assembly 810, a neutron detection assembly 820, an occupancy/speed sensor 830, a gate control detector 840 and a data collecting and processing assembly 900, wherein respective functional modules can be added or reduced as required.

The brief description of the main modules in the radiation monitor is given below.

The gamma detection assembly 810 comprises a plastic scintillator with large area and high sensitivity and a PMT, and detects gamma rays and transmits its signal to a data acquiring and processing assembly.

The neutron detection assembly (optional) 820 comprises an optimized moderator-structured He-3 proportional count tube, detects neutrons and transmits its signal to the data acquiring and processing assembly. The neutron detection assembly can be operable to enhance the detection capability for special nuclear material.

The occupancy/speed sensors 830 comprises opposite-type infrared sensors placed on opposite detection pillars, learns the occupancy states of the object under inspection and obtains its speed and direction.

The data collecting and processing assembly 900 comprises a signal communicating and processing module 910 and a data collecting and processing computer 920, performs data acquirement, analysis and processing on the signal from the detection assemblies, and displays and records results as required, and outputs them by connected printers and/or networks.

According to an embodiment of the present invention, the radiation monitor and the radiographic examination system as described above are combined tightly to effectively improve security inspection, and significantly reduce the occupied area and the management cost of the system.

Figure 2:
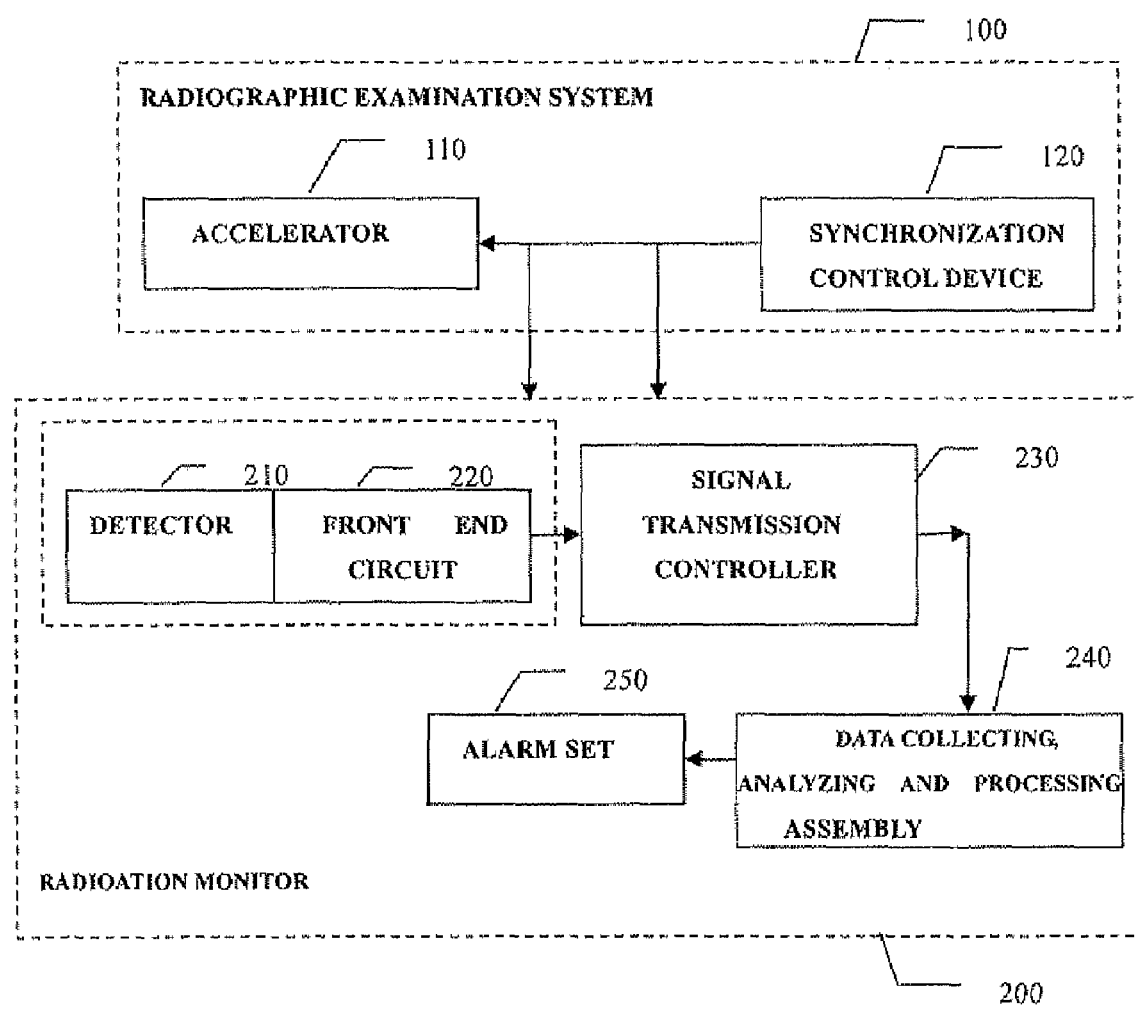
FIG. 2 is a schematic diagram of the overall configuration according to an embodiment of the present invention.

The system capable of simultaneous radiographic examination and radioactive material inspection according to an embodiment of the present invention is constructed as shown in FIG. 2. The system comprises two parts, i.e. the radiographic examination system 100 and the radiation monitor 200. The radiographic examination system 100 comprises an accelerator 110 and a synchronization device 120. The radiation monitor 200 comprises detectors 210 and their front end circuit 220, a signal transmission controller 230, a data collecting, analyzing and processing computer 240, and an alarm set 250. The electronic signals outputted from the detectors 210 and other sensors are connected to the signal transmission controller 230, and finally transmitted to the data collecting, analyzing and processing computer 240 to be analyzed and processed. When the radiation monitor 200 detects radioactive materials, the alarm set 250 will be triggered.

In the embodiment, the detector 210 and the front end circuit 220 are integrated to form a gamma detection assembly. The detector 210 comprises a scintillator and a PMT, which is used for detecting gamma rays. The PMT additional circuit belongs to the front end circuit of the gamma detection assembly, and is necessary for the gamma detection assembly. The front end circuit 220 finally output the electric signals corresponding to the gamma rays detected by the detector.

The radiation monitor shown in FIG. 1 is a real applicable one, but the neutron detection assembly 820, the temperature control assembly 710, video 730, the gate controller 840 and the UPS etc. are optional for the system, though usually included. The main purpose of FIG. 2 is to illustrate the relationship between the radiographic examination system 100 and the radiation monitor 200, to explain how they synchronize with each other, and the detector and the front end circuit refer to the gamma detection assembly.

Figure 5:
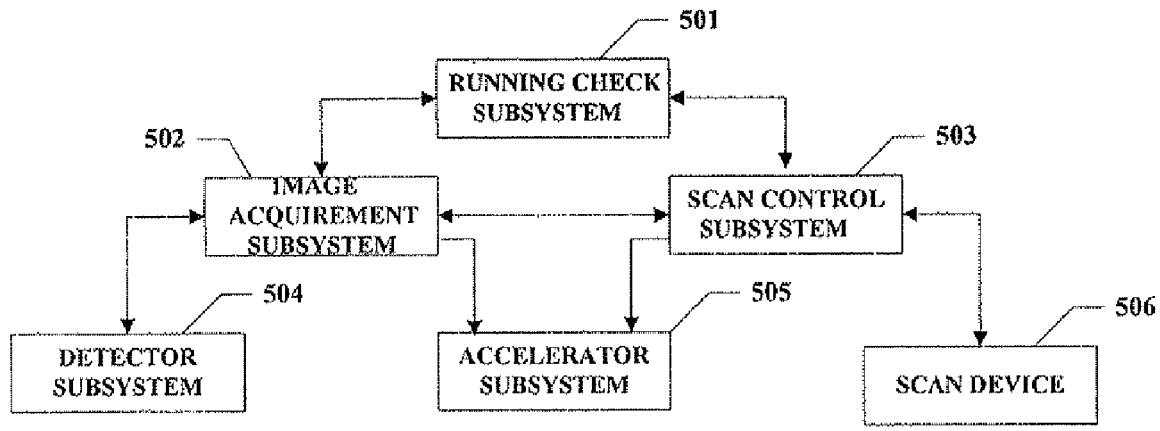
FIG. 5 is a schematic diagram of a radiographic examination system according to an embodiment of the present invention.

In an implementation according to the present invention, the radiographic examination system is a vehicle/container examination system which uses an accelerator as the radiation source, and it reflects the difference between the object's internal mass thicknesses by detecting the changes of the intensity of X/γ radiations which penetrate the object. The whole radiographic examination system is complicated, and usually comprises an accelerator subsystem 505, a detector subsystem 504, a scan device 506, a scan control subsystem 503, an image acquirement subsystem 502 and a running check subsystem 501, and so on, as shown in FIG. 5, the accelerator subsystem 505 generates X/γ radiations in the form of pulses, and the detector subsystem 504 detects the changes of the intensity of the radiations which penetrate the object, and converts them into electric signals, and transmits them to the image acquirement subsystem 502, and finally the radiographic examination is ended at the running check subsystem 501. The scan device 506 is operable to execute required scanning actions (for example, scanning for the fore-and-aft movement of the vehicle in an on-board radiographic examination system), and the scan control subsystem 503 is operable to control the operational states of the scan device 506 and the accelerator 505.

The parts relevant to the synchronization with the radiation monitor are the accelerator, the synchronization control device in the image acquirement subsystem. The main function of the synchronization control device in the image acquirement subsystem is to generate pulse signals for synchronizing the accelerator and the detector.

Figure 6:
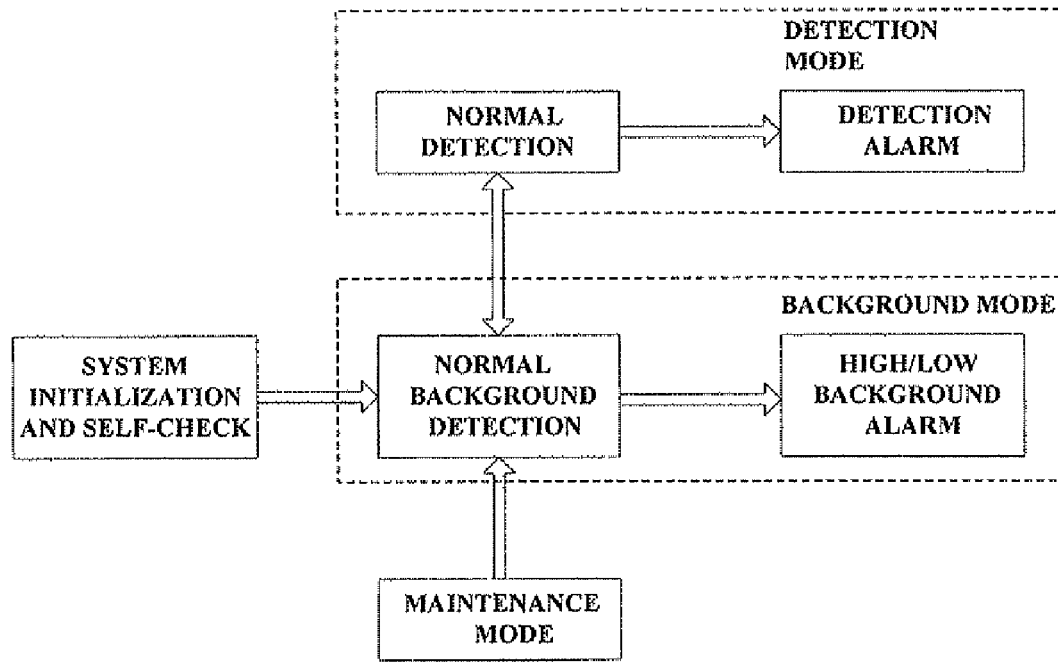
FIG. 6 is a flowchart of operating a radiation monitor according to an embodiment of the present invention.

The operational flowchart of the radiation monitor is shown in FIG. 6, and includes three modes, i.e. background mode, detection mode and maintenance mode.

The system enters into the background mode when it is powered on. The gamma and neutron detection assemblies detect radiations and transmit signals to the data acquirement and process device to be analyzed and processed by the data collecting and processing assembly. In the background mode, the background count rate is continuously collected and updated to reflect the real-time change of the intensity of the natural background radiations. The background count rate should be updated at least once per 100 s. If the background radiation intensity is not in a normal range, then the monitor will generate an alarm to inform the operators.

Once a vehicle with containers enters the detection area of the monitor, the occupancy/speed sensors will be triggered; the monitor will enter into the detection ode automatically. In the detection mode, the monitor will detect the intensity of the radiations, analyze the level of the radiations, and compare it with an alarm threshold obtained based on the previous background count rate. If the level of the radiations is higher than the alarm threshold, then the monitor will issue an audible and visual alarm. The monitor also generates an alarm log which includes useful information such as alarm data, generation time, alarm type etc., and can output them through printers and/or networks.

If system maintenance is needed, the maintenance mode is available to the monitor. In the maintenance mode, the functions such as user setting, parameters acquiring and modifying, functions/algorithms adjusting and using, etc can be executed.

When the vehicle/container examination system which uses an accelerator as the radiation source is examining the vehicle/container, the accelerator emits X//γ radiations in the form of pulses. The radiation monitor can use only the pulse intervals of the linear accelerator to acquire radiation data in order to avoid the interference of radiations generated by the accelerator. Usually, the interference of radiations generated by accelerator in the radiographic examination system in a very short time will cause the signals in the gamma detection assembly in the radiation monitor accumulated such that the gamma detection assembly needs a long time to be recovered (the length of this recovery time is dependent on the gamma rays' flux from the accelerator into the gamma detection assembly; and it varies as different integrated systems, usually is several milliseconds). Therefore, it can not be solved by simply making the radiation monitor to work when the accelerator does not emit radiations. Firstly, a gate circuit with an adjustable pulse width is needed to perform synchronization control. A gate circuit with adjustable pulse width is a common technology, and is included in the signal transmission controller in the embodiment.

When the dose of the radiations emitted by the accelerator is not too large, and the frequency of the radiations is not too high, a common gate circuit can be provided in the circuit of the gamma detection assembly to remove the count during the gamma detection recovery time (nearly several milliseconds) when and after the emission of the accelerator such that the radiographic examination and the radiation monitor can be performed at the same time. However, when the dose of the radiations emitted by the accelerator is large and the frequency of the radiations is high, the radiations entering the radiation monitor in one time will cause the detector to generate a lot of photons in a short time, and these photons will make the PMT deeply saturated due to the photoelectric effect and multiplication characteristic of the PMT, so the recovery time of the PMT after deep saturation will be longer (far longer than the pulse width of the synchronization signal). Besides, the base line of the successive signal processing circuit will deteriorate as the generation of oscillation, and the background count rate is wrongly raised, which not only will cause monitor to issue a false alarm, but also can not satisfy the requirement of accurate inspection. Because the high-voltage needed by the PMT to operate can not be switched frequently in the order of milliseconds (because the PMT needs a stabilized time far larger than several milliseconds to be operable normally), so it can not be solved by switching the high voltage of the PMT during the emission of the accelerator.

In order to reduce the affect of the short-time high-dose incident photons on the detector of the radiation monitor to the acceptable extent, a special designed additional circuit for PMT is adopted to achieve rapid recovery of the detector after short-time high-dose irradiations. The concrete method is to cut down the source of the electrons generation by controlling electric field between the first dynodes of the PMT by means of an external synchronization signal to effectively remove the affect of the short-time high-dose X/γ radiations. By doing so, the synchronization device generates a synchronization gate pulse signal and the electric field between the first dynodes of the PMT cut off the PMT during the emission of the accelerator, and the PMT will rapidly resume its operation after the accelerator stops emission, and the operating states of the PMT can be switched stably and reliably over a long period of time.

Besides, in an embodiment of the present invention, the accelerator is operative by pulses, and the PMT operates at intervals of the emission pulses; therefore, during the operation of the accelerator's pulses, the photoelectric multiplier is also operative.

Figure 3:
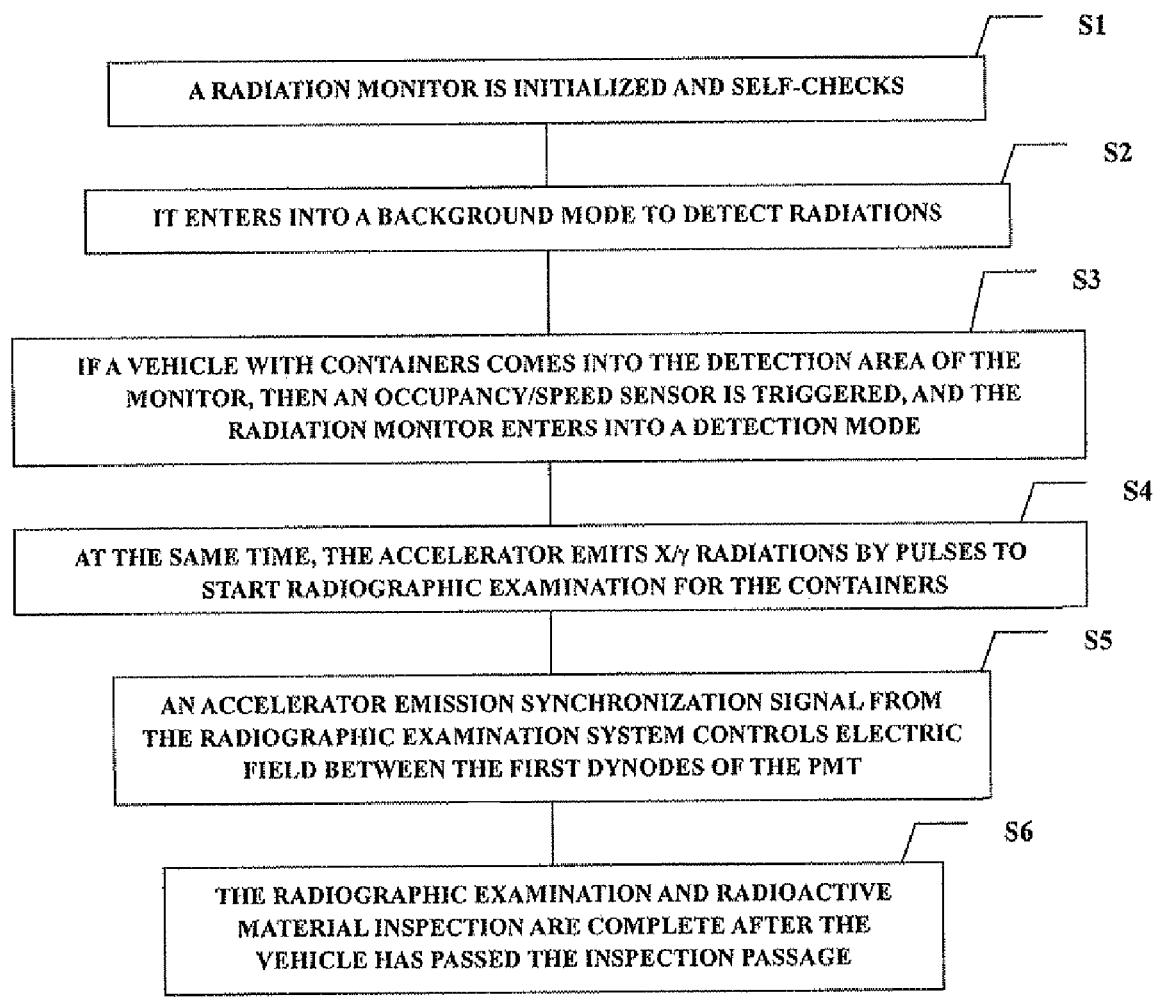
FIG. 3 is a schematic diagram of the overall configuration according to an embodiment of the present invention.

The overall operational flowchart of operating the system according to an embodiment of the present invention is shown in FIG. 3, which includes:

S1: a radiation monitor initializes and self-checks;

S2: it enters into a background mode to detect radiations, and continuously collect and timely update the background count rate, and generate an alarm if the intensity of the background radiation goes beyond the normal range;

S3: if a vehicle with containers comes into the detection area of the monitor, then an occupancy/speed sensor is triggered, and the monitor enters into a detection mode;

S4: at the same time, an accelerator emits X/γ radiations by pulses to start radiographic examination for the containers;

S5: an accelerator emission synchronization signal from the radiographic examination system cuts down the source of the electrons generated by the PMT by controlling electric field between the first dynodes of the PMT to effectively remove the affect of the short-time high-dose X/γ radiations;

S6: the radiographic examination and radioactive material inspection are complete after the vehicle has passed the inspection passage.

Figure 4:
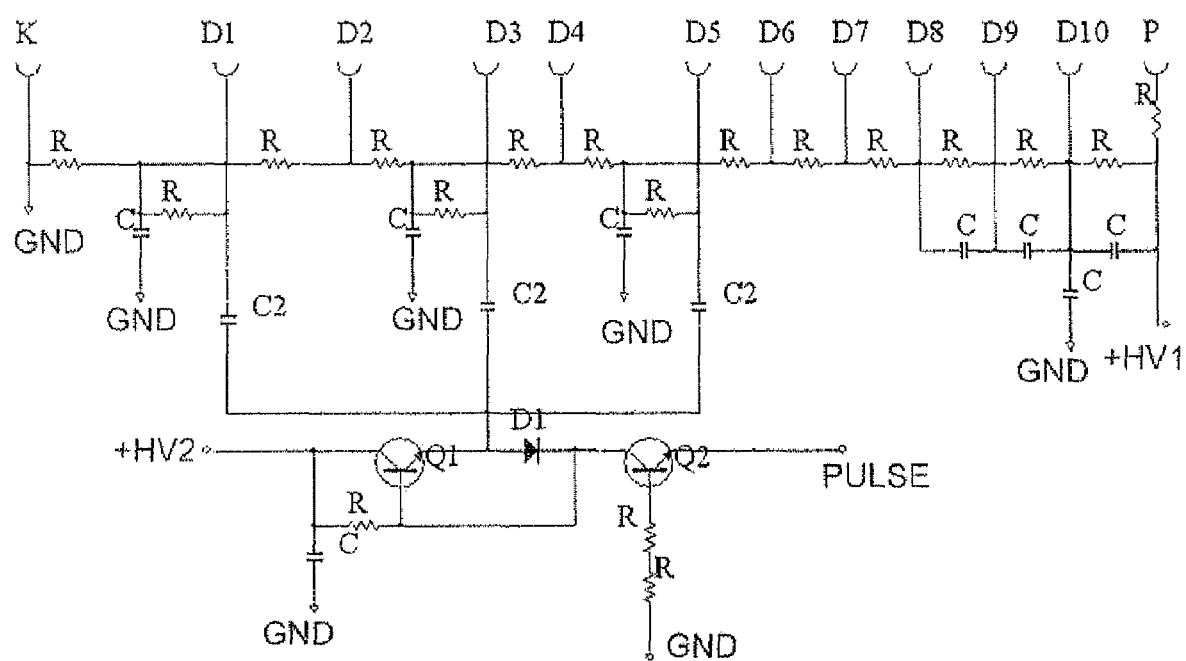
FIG. 4 is a circuit schematic diagram of a PMT additional circuit according to an embodiment of the present invention.

The special designed PMT according to an embodiment of the present invention can be obtained by modifying a common PMT divider circuit, and the circuit principle thereof is shown in FIG. 4. The PMT according to an embodiment of the present invention can be provided with a divider loop having a cathode grounded or a divider loop having an anode grounded. The following description is given out based on a divider loop with a cathode grounded.

When no control signal is applied, the PMT is in ON state, which is the same as a common PMT. When a control signal applies a positive pulse signal (of high level) on the triode Q2, Q2 is on. A pulse voltage is generated at the capacitor C2 by means of a voltage HV2 far lower than the operational voltage of the PMT, and C2 discharges to lower the voltage of D1 to 0V, and then the voltage of D3 is lower than that of D2, thereby the directions of the electronic fields between K and D1, and D2 and D3 are changed such that the electronics emitted by K can not reach D1; for the same reason, the voltage of dynode D5 is also lower than that of D4 such that PMT is cut off. Thereby, the radiations contributed by accelerator can not interfere with the monitor, and the PMT and the successive output are prevented from being saturated, otherwise ill affect such as characteristic deterioration would occur.

Furthermore, the working logic of PMT and that of control signals can be reverted by simply modifying the input circuit of Q2.

In summary, a synchronization signal of the emission of the accelerator is used to control the modified PMT to achieve synchronized operation of the radiation monitor and the radiographic system.

Although the present invention have been illustrative and shown with reference to an exemplary embodiment thereof, those skilled in the field would appreciate that any variations in forms or details can be made, which will not depart from the real spirit of the invention and the scope of the present invention.

What is claimed is:

1. A system capable of simultaneous radiographic examination and radioactive material inspection, comprising a radiographic examination system and a radiation monitor; wherein the radiographic examination system comprises an accelerator and a synchronization controller, and the radiation monitor comprises a detector, a front end circuit, a signal transmission controller, a data collecting, analyzing and processing computer and an alarm device; and wherein a synchronization controlling signal coming from the synchronization controller in the radiographic examination system forms a gate signal with adjustable pulse width in the signal transmission controller in the radiation monitor, which is used to remove the data collected by the radiation monitor during the emission of the accelerator.

2. The system as set forth in claim 1, wherein the radiation monitor sets an alarm threshold on the basis of a background count rate.

3. The system as set forth in 2, wherein a modified PMT additional circuit is provided in the radiation monitor to achieve rapid recovery of the detector after short-time high-dose irradiations.

4. The system as set forth in claim 3, wherein the system cuts down the source of the electrons by controlling electric field between the first dynodes of the PMT by means of an external synchronization signal to effectively remove the affect of the short-time high-dose X/γ radiations.

5. The system as set forth in claim 3, wherein the PMT adopted in the photomultiplier tube additional circuit is provided with a voltage divider loop having a cathode grounded or a voltage divider loop having an anode grounded.

6. A method capable of simultaneous radiographic examination and radioactive material inspection, comprising the steps of:

initializing and self-checking at a radiation monitors;

entering into a background mode to detect radiations, and continuously collect and timely update the background count rate, and generate an alarm if the intensity of the background radiation goes beyond the normal range;

triggering an occupancy/speed sensor, and causing the monitor enter into a detection mode if a vehicle with containers comes into the detection area of the monitor;

emitting X/γ radiations from an accelerator by pulses to start radiographic examination for the containers;

cutting down the source of the electrons generated by the PMT by controlling electric field between the first dynodes of the PMT using an accelerator emission synchronization signal from a radiographic examination system, to effectively remove the affect of the short-time high-dose X/γ radiations;

completing the radiographic examination and radioactive material inspection after the vehicle has passed through the inspection passage.

7. The method as set forth in claim 6, wherein if the radiation monitor needs system maintenance, it enters into a maintenance mode from the background mode, in which advanced functions are executed.

8. The method as set forth in claim 6 or 7, wherein in the step of cutting down the source of the electrons, the accelerator emission synchronization signal is sent to the radiation monitor through the synchronization controller, and forms a gate signal with adjusted pulse width in the signal transmission controller in the radiation monitor to remove the data collected by the monitor during the emission of the accelerator.

9. The method as set forth in claim 8, wherein a modified PMT additional circuit is provided in the radiation monitor to achieve rapid recovery of the detector after short-time high-dose irradiations.

10. The method as set forth in claim 9, wherein the PMT adopted in the photomultiplier tube additional circuit is provided with a voltage divider loop having a cathode grounded or a voltage divider loop having an anode grounded.

11. The method as set forth in claim 8, wherein the radiation monitor sets an alarm threshold on the basis of the background count rate when the monitor detects no objects.

* * * * *